Jan. 13, 1959
W. L. WOOD
2,868,563
FLUID LINE COUPLING DEVICE
Filed June 5, 1956
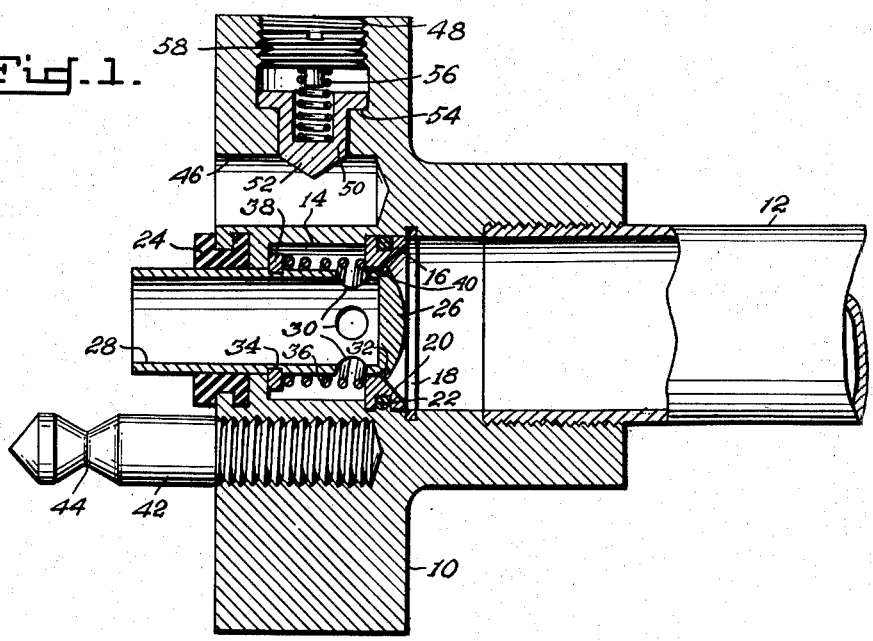
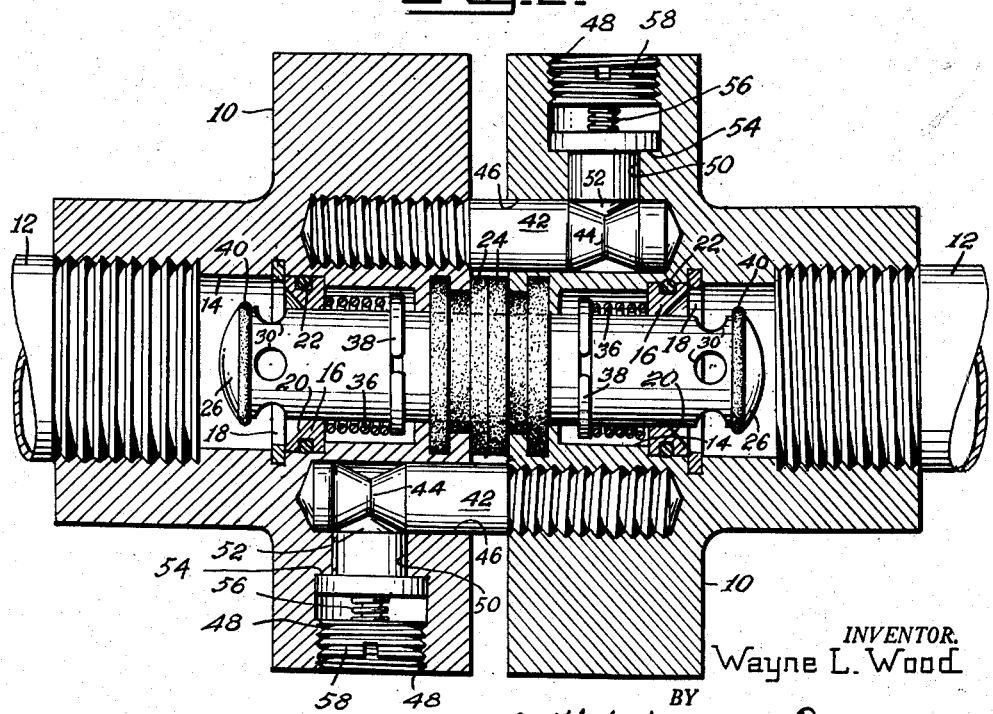
INVENTOR.
Wayne L. Wood
BY
W. E. Thibodeau & A. W. Dew, ATTORNEYS
and R. M. Lyon, AGENT.

2,868,563

FLUID LINE COUPLING DEVICE

Wayne L. Wood, East Detroit, Mich.

Application June 5, 1956, Serial No. 589,567

3 Claims. (Cl. 284—1)

(Granted under Title 35, U. S. Code (1952), sec. 266)

The invention described in the attached specification and claims may be manufactured and used by or for the Government for governmental purposes without the payment to me of any royalty thereon.

The invention relates to couplings, particularly fluid couplings of the type which may be quickly connected and disconnected.

In the coupling art difficulty has been experienced in designing a coupling which is easily connected and disconnected, yet maintains a tight seal during coupling, and this invention contemplates a coupling construction which will meet these requirements. In the construction of heavy machinery it is often desired to use quick connecting couplings for oil, water, fuel, etc., lines to facilitate ready removal of motors or such for repair or replacement. Due to the design of the machinery, the couplings are often located in hard-to-reach positions where it is impossible to use the two hands necessary to disengage most quick connect couplings, and this invention describes a coupling which may be used in such inaccessible locations, yet may readily be connected and disconnected.

It is an object of this invention to design a fluid coupling which is easily connected and disconnected, yet is tightly sealed.

It is a further object of this invention to produce a fluid coupling which will automatically open and close the fluid flow as the coupling is connected and disconnected respectively.

Another object of the invention is to produce a fluid coupling wherein the couplings are homogeneous and may be connected to any other similar coupling.

Yet another object of the invention is to design a fluid coupling wherein the coupling pressure may be adjusted, thereby imparting the qualities of a safety valve to the coupling.

Fig. 1 is a cross section elevational view of a disconnected coupling.

Fig. 2 is a semicross section elevation of two couplings in engaged position.

In the disclosed embodiment only one coupling will be described as both members are identical. The coupling comprises a body 10 adapted to be connected to the end of a hose 12. A bore 14 communicates with the bore of hose 12 and houses the valve elements. The valve elements are comprised of a valve collar 16 which is held in bore 14 by a ring snap 18 and has an axial bore formed with a conical valve seating surface 20. An O ring 22 seals the collar 16 and bore 14.

A resilient tubular seal 24 is fitted to the outer end of body 10, concentric to bore 14, by means of cooperating flanges and undercut recesses formed in seal 24 and body 10 respectively. Seal 24 may be of any resilient material, rubber, plastic, leather or such depending on which composition gives the best service with the particular fluid being transmitted through the coupling.

A valve 26, Fig. 1, is slidably supported within bore 14 by valve collar 16 and the bore of seal 24. Valve 26 is provided with an axial bore 28 which is intersected by a series of transverse bores 30. Grooves 32 and 34 are formed in the exterior surface of the valve for purposes described hereinafter.

A spring 36 surrounds valve 26, the ends of which bear against collar 16 and a snap ring 38 located in groove 34. An O ring 40 lies in groove 32 such that as spring 36 biases valve 26 outwardly, O ring 40 will seat on surface 20 of collar 16 creating a tight seal and prevent fluid from flowing from the disconnected coupling.

A pin 42 is threadedly supported in the outer face of body 10 and is provided with a V groove 44. A bore 46 is drilled in the end of body 10 diametrically opposite to pin 42.

Spring detent means extend radially into body 10 and comprise in part a threaded bore 48 and a smaller bore 50 intersecting bore 46. A detent 52 is slidably positioned in bore 50 by a shoulder 54. A spring 56 biases detent 52 inwardly, the pressure of which is regulated by threaded plug 58. Plug 58 is provided with graduations on its outer surface such that the pressure exerted by spring 56 may be determined.

The operation is as follows:

The spring 36 will hold the valve 26 shut while the coupling is disconnected; the open end of valve 26 will extend beyond seal 24 as seen in Fig. 1. A second coupling is brought into contact with the first coupling, such that the pin 42 of one coupling is coincident with the bore 46 of the other coupling. As the two couplings are brought together, detents 52 will pass over the ends of pins 42 and engage V grooves 44, at the same time the protruding ends of valve 26 will contact each other, compressing springs 36 and unseating O rings 40. As the fluid flows past O ring 40, the flow will continue through bores 30 and 28 from one coupling to the other forming the fluid connection. Seals 24 will be tightly held together by the pin and detent arrangement providing a fluid tight seal between the couplings.

To disconnect the coupling sufficient force must be applied to disengage detents 52 from grooves 44; this movement permits the couplings to be separated allowing springs 36 to move valves 26 outwardly until once again O rings 40 are seated and the flow of fluid closed off, see Fig. 1.

Several unique features are possible due to the pin and detent construction. By adjusting the length of pins 42, which are threaded in body 10, the faces of grooves 44 may be positioned relative to detents 52, such that springs 56 constantly urge the couplings toward each other insuring a tight connection between seals 24.

As the pressure exerted by springs 56 may be accurately controlled by adjusting threaded plugs 58, the force required to connect and disconnect the couplings may be regulated. Therefore, should it be desired to utilize the couplings as a safety feature, the operator may adjust plugs 58 by observing the reference marks formed on the outer surface thereof, such that upon the fluid obtaining a predetermined pressure the couplings will disconnect and stop the fluid flow. For example, should the coupling be used in a fluid line supplying mechanism in which the pressure should not surpass 60 pounds per square inch, plugs 58 would be adjusted such that should the fluid in hose line 12 reach 60 pounds per square inch pressure, the couplings would separate and no damage would therefore be inflicted upon the mechanism supplied by the fluid. Where the coupling is not to be used as a safety valve, the pressure of springs 56 will be adjusted such that the pressure required to separate the coupling will be well above the pressure of the fluid.

I claim:

1. In a pair of identical fluid coupling body members employing mutually operated sliding valves, coupling means comprising a pin projecting from each of said body members, means varying the extent of projection of said pin from the body member, a groove formed in said pin, said groove including an inclined surface, a recess within said body member adapted to receive the pin of the other body member, a bore intersecting said recess, detent means slidably movable in said bore for engagement with said surface urging said body members toward each other, and adjustable means biasing said detent means toward said recess.

2. In a pair of identical fluid coupling body members employing mutually operated sliding valves, coupling means comprising a pin threadly affixed to and projecting from each of said body members, a groove formed in said pin, said groove including an inclined surface, a recess formed in said body member adapted to receive the pin of the other body member, a bore intersecting said recess, threads formed in a portion of said bore, a detent slidably positioned within said bore for engagement with said surface urging said body members toward each other, a spring biasing said detent toward said recess and a threaded plug within said bore backing said spring and adapted to vary the tension thereof.

3. A fluid coupling comprising a pair of identical interlocking body members, connecting means in each member for connecting said member to a fluid conduit; each of said members having an axial bore for communication with said conduit so as to form a fluid passage; annular sealing means carried by each of said body members and concentric with said bore; said sealing means having mutually engageable faces extending past said body member cooperating to establish a tight seal when said body members are forced together; a collar fixed in each of said bores; a tubular valve member closed at one end slidable in said annular sealing means and said collar, sealing means on said closed end of said valve member engaging said collar so as to prevent flow of fluid, said collar thereby forming a seat for said valve member; said valve member extending past said annular sealing means carried by said body member so that when said faces are forced together said valve member is unseated; said valve member having transverse bores so as to allow fluid flow when said valve member is unseated from said collar, and coupling means mounted upon and locking together said body members upon relative axial movement thereof, said coupling means comprising a pin fixed in each of said body members and extending axially from said body members, a groove formed in each of said pins, said groove having an inclined surface, each of said body members having a bore adapted to receive the pin of the other body member, each of said body members having a second bore intersecting said pin receiving bores, a detent slidably positioned in each of said second bores for engagement with said inclined surface of each of said pins, a spring biasing said detent toward said pin thereby holding said body members and the sealing means carried therein in a coupled position, and adjustable means for varying the axial force required for separating said interlocking body members, said adjustable means comprising a threaded portion in said second bore and a threaded plug in said threaded portion backing said spring, the position of said plug in said threaded portion determining the force exerted by said detent on said pin and thereby the force required to separate said body members.

References Cited in the file of this patent

UNITED STATES PATENTS

| | | |
|---|---|---|
| 416,767 | Walker | Dec. 10, 1889 |
| 1,877,924 | Mackin | Sept. 20, 1932 |
| 2,441,363 | Krueger | May 11, 1948 |
| 2,453,480 | Williamson et al. | Nov. 9, 1948 |
| 2,637,572 | Bruce | May 5, 1953 |
| 2,641,272 | Seale | June 9, 1953 |
| 2,642,297 | Hanna | June 16, 1953 |
| 2,678,834 | Courtot | May 18, 1954 |